2,964,543

3,17-BISOXYGENATED ANDROST-4-EN-9α-OLS

Raymond M. Dodson, Park Ridge, Ill., assignor to G. D. Searle & Co., Chicago, Ill., a corporation of Delaware No Drawing. Filed Dec. 22, 1959, Ser. No. 861,210

7 Claims. (Cl. 260—397.45)

The present invention relates to novel steroids containing a 9α-hydroxy substituent and, more particularly, to 9α - 17β - dihydroxyandrost - 4 - en - 3 - one and derivatives thereof. The compounds of this invention can be represented by the structural formula.

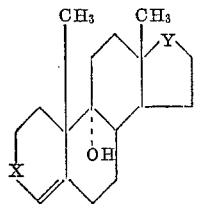

wherein X is selected from the group consisting of carbonyl, β-hydroxymethylene, and β-(lower alkanoyl) oxymethylene radicals; and Y is selected from the group consisting of β-hydroxymethylene and β-(lower alkanoyl) oxymethylene radicals. Lower alkanoyl radicals which X and Y can represent are exemplified by formyl, acetyl, propionyl, butyryl, valeryl, caproyl, and the branched-chain isomers thereof, said groups being the acyl radicals of alkanoic acids containing fewer than 7 carbon atoms.

A starting material suitable for the manufacture of the compounds of this invention is 9α-hydroxyandrost-4-ene-3,17-dione. Treatment of this diketone with a limited quantity of sodium borohydride and aqueous sodium hydroxide in methanol results in selective reduction of the 17-keto group, thus producing 9α,17β-dihydroxyandrost-4-en-3-one. When excess sodium borohydride is utilized in this reduction, a mixture of epimeric 3,9α,17-triols is obtained. Acylation of this epimeric mixture, suitably with a lower alkanoic acid anhydride in pyridine, affords the corresponding 3β,17β-di-(lower alkanoate). For example, treatment with acetic anhydride in pyridine yields 3β,17β-diacetoxyandrost-4-en-9α-ol. Hydrolysis of these 3β,17β-di-(lower alkanoates), preferably with aqueous sodium hydroxide, produces the instant androst-4-ene-3β,9α,17β-triol. This triol can be oxidized with manganese dioxide in a suitable solvent to afford the aforementioned 9α,17β-dihydroxyandrost-4-en-3-one.

When the instant 9α,17β-dihydroxyandrost-4-en-3-one is subjected to acylating conditions, for example by reaction with a lower alkanoic acid anhydride in pyridine, the corresponding 17β-(lower alkanoate) is obtained. As a specific example, by reaction with acetic anhydride in pyridine, 17β-acetoxy-9α-hydroxyandrost-4-en-3-one is produced.

When the aforementioned androst-4-ene-3β,9α,17β-triol is treated with a limited quantity of an acylating agent, a mixture of the 3β-mono-(lower alkanoate) and the 17β-mono-(lower alkanoate) is obtained. These mono-(lower alkanoates) are separable by chromatography. For instance, reaction of this triol with acetic anhydride in pyridine results in 3β-acetoxyandrost-4-ene-9α,17β-diol and 17β-acetoxyandrost-4-ene-3β,9α-diol.

The compounds of this invention are useful as a result of their valuable pharmacological properties. They possess, for example, hormonal and anti-hormonal properties in consequence of their androgenic activity and their ability to inhibit the sodium-retaining activity of desoxycorticosterone acetate.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight except where otherwise noted.

Example 1

To a warm solution of 5 parts of 9α-hydroxy-androst-4-ene-3,17-dione in 32 parts of ethanol is added a solution of 2.5 parts of sodium borohydride in 30 parts of water and 24 parts of ethanol. The reaction mixture is allowed to stand at room temperature for one and one-half hours, then treated with dilute acetic acid to destroy the excess borohydride. The solution is diluted with water and extracted with methylene chloride. The organic extract is washed with water, dried over anhydrous sodium sulfate, and concentrated to dryness under reduced pressure. The residue is crystallized from benzene to yield crude androst-4-ene-3,9α,17-triol; M.P. 163–168°.

A mixture of 1.66 parts of the aforementioned crude triol, 5 parts of acetic anhydride, and 20 parts of pyridine is allowed to stand at room temperature for about one and one-quarter hours. The solution is diluted with ice water and the resulting crystalline product collected by filtration. Recrystallization from aqueous acetone yields 3β,17β-diacetoxyandrost-4-en-9α-ol, M.P. 162–164.5°; [α]$_D$=+4.0°.

By substituting isovaleric anhydride and otherwise proceeding according to the herein-described processes, 3β,17β-diisovaleryloxyandrost-4-en-9α-ol is obtained. Its infrared absorption spectrum possesses maxima at 2.9, 5.7, 5.8, and 6.0 microns.

Example 2

A mixture of 2.7 parts of 3β,17β-diacetoxyandrost-4-en-9α-ol, 40 parts of methanol, and 50 parts of an aqueous solution containing 3 parts of sodium hydroxide is stirred at room temperature for one hour to achieve solution, then allowed to stand for 2 hours longer. The solution is neutralized with acetic acid, diluted with water, and extracted with methylene chloride. The methylene chloride solution is dried over anhydrous sodium sulfate and evaporated to dryness in vacuo to yield the crude product. Recrystallization from an acetone-cyclohexane solution results in pure androst-4-ene-3β,9α,17β-triol, M.P. 177–179°; [α]$_D$=+37.9°.

Example 3

To a solution of one part of crude androst-4-ene-3,9α,17-triol in 120 parts of benzene is added 10 parts of manganese dioxide, and the mixture is stirred at room temperature for 7 hours. The reaction mixture is filtered to remove the mixed manganese oxides and the filter cake washed successively with ethyl acetate and acetone. The filtrate and washings are combined and evaporated to dryness in vacuo. The residue is dissolved in 10% ethyl acetate-90% benzene and adsorbed on a silica gel chromatographic column. Elution with 35% ethyl acetate-65% benzene followed by crystallization from acetone-cyclohexane affords 9α,17β-dihydroxyandrost-4-en-3-one, M.P. 198–200°; [α]$_D$=+104°.

Example 4

To a stirred solution of 5 parts of 9α-hydroxyandrost-4-ene-3,17-dione and one part of sodium hydroxide in 800 parts of methanol is added, at 2–4°, a solution of one part of sodium borohydride in 20 parts of water. The reaction mixture is stirred at 2–4° for one hour, then neutralized with 10 parts of acetic acid. The mixture is distilled to remove the methanol, then diluted with water; and the resulting precipitate is collected by filtration, dissolved in 20% ethyl acetate-80% benzene, and adsorbed on silica gel. Elution of the column with 35% ethyl acetate-65% benzene, followed by crystallization from acetone-cyclohexane yields 9α,17β-dihydroxyandrost-4-en-3-one. This product is identical with that described in Example 3.

Example 5

A mixture of 4.4 parts of 9α,17β-dihydroxyandrost-4-en-3-one, 30 parts of acetic anhydride, and 30 parts of pyridine is allowed to stand at room temperature for 4 hours, then diluted with water. The resulting precipitate is collected by filtration and crystallized from acetone-hexane to afford 17β-acetoxy-9α-hydroxyandrost-4-en-3-one, M.P. 209.5–211°; $[\alpha]_D = +101.5°$.

By substituting butyric anhydride and otherwise proceeding according to the herein described processes, 17β-butyroxy-9α-hydroxyandrost-4-en-3-one is obtained. It possesses maxima in the infrared at 2.85, 5.8, 5.97, and 6.2 microns.

Example 6

A mixture of 3 parts of androst-4-ene-3β,9α,17β-diol, one part of acetic anhydride, and 10 parts of pyridine is allowed to stand at room temperature for about 16 hours, then diluted with water and extracted with methylene chloride. This organic extract is washed successively with dilute hydrochloric acid and water, dried over anhydrous sodium sulfate, and evaporated to dryness in vacuo. A benzene solution of the residue is adsorbed on silica gel. The column is washed with 10% ethyl acetate in benzene. Successive elutions with 30% ethyl acetate in benzene result in 3β-acetoxyandrost-4-ene-9α,17β-diol and 17β-acetoxyandrost-4-ene-3β,9α-diol, M.P. 214.5–216.5°.

The substitution of an equivalent quantity of propionic anhydride in the process of this example results in 3β-propionoxyandrost-4-ene-9α,17β-diol and 17β-propionoxyandrost-4-ene-3β,9α-diol.

What is claimed is:
1. A compound of the structural formula

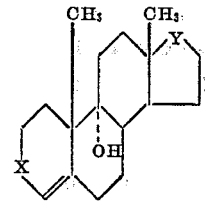

wherein X is selected from the group consisting of carbonyl, β-hydroxymethylene, and β-(lower alkanoyl)oxymethylene radicals; and Y is selected from the group consisting of β-hydroxymethylene and β-lower alkanoyl)-oxymethylene radicals.
2. 9α,17β-dihydroxyandrost-4-en-3-one.
3. 17β-acetoxy-9α-hydroxyandrost-4-en-3-one.
4. 3β,17β-diacetoxyandrost-4-en-9α-ol.
5. Androst-4-ene-3β,9α,17β-triol.
6. 3β-acetoxyandrost-4-ene-9α,17β-diol.
7. 17β-acetoxyandrost-4-ene-3β,9α-diol.

References Cited in the file of this patent
UNITED STATES PATENTS

| | | |
|---|---|---|
| 2,311,067 | Miescher et al. | Feb. 16, 1943 |
| 2,374,370 | Miescher et al. | Apr. 24, 1945 |

OTHER REFERENCES

Chinn et al.: J. Org. Chem., vol. 24, No. 6, June 1959, page 879.